(12) United States Patent
Takizawa et al.

(10) Patent No.: US 6,323,752 B1
(45) Date of Patent: Nov. 27, 2001

(54) ELECTRONIC INSTRUMENT HAVING RESETTABLE SECURITY CODE AND METHOD FOR RESETTING SECURITY CODE

(75) Inventors: Yuji Takizawa, Tokyo; Daisaku Matsufuji, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/965,966

(22) Filed: Nov. 7, 1997

(30) Foreign Application Priority Data

Nov. 12, 1996 (JP) .............................. P08-300724

(51) Int. Cl.[7] ...................................... H04Q 1/00
(52) U.S. Cl. .......................... 340/5.24; 340/5.22; 70/278
(58) Field of Search ............................ 340/825.31, 426, 340/825.56, 825.5, 825.3, 572.3, 572.4, 572, 825.34, 5.24, 5.22; 70/278, 277; 1/1

(56) References Cited

U.S. PATENT DOCUMENTS

| | | | |
|---|---|---|---|
| 4,494,114 | * 1/1985 | Kaish | 340/825.31 |
| 4,502,048 | * 2/1985 | Rehm | 340/825.31 |
| 4,759,062 | 7/1988 | Traub et al. | 380/25 |
| 5,061,923 | * 10/1991 | Miller et al. | 340/825.31 |
| 5,091,939 | * 2/1992 | Cole | 340/825.34 |
| 5,144,667 | * 9/1992 | Pogue | 340/825.31 |
| 5,274,370 | * 12/1993 | Morgan et al. | 340/825.56 |
| 5,347,267 | * 9/1994 | Murray | 340/825.31 |
| 5,488,358 | * 1/1996 | Hamilton et al. | 340/825.31 |
| 5,604,489 | * 2/1997 | Hyatt, Jr. | 340/825.56 |
| 5,613,388 | * 3/1997 | Murphree | 70/278.4 |
| 5,708,712 | * 1/1998 | Brinkmeyer et al. | 340/825.31 X |

FOREIGN PATENT DOCUMENTS

| | | | |
|---|---|---|---|
| 2120434 | 11/1983 | (GB) | G06F/9/00 |
| 2244831 | 12/1991 | (GB) | G07C/9/00 |

* cited by examiner

*Primary Examiner*—Brian Zimmerman
(74) *Attorney, Agent, or Firm*—Jay H. Maioli (57) ABSTRACT

An electronic instrument having a resettable security code as a way of preventing the burglary of the electronic instrument mounted to a movable device such as a car. When the electronic instrument is mounted to the movable device or a battery is exchanged, the entry of the security code is required by the user. If the user does not know or remember the security code, a random number is automatically generated inside of the electronic instrument and converted into an initializing code according to the predetermined rules. The user reports the generated random number to a service company or the manufacturer. The service company or the manufacturer checks if the user is registered. When the user is certified, the service company or the manufacturer gives the initializing code corresponding to the random number to the user. Then, the user enters the given initializing code for resetting the security code.

2 Claims, 10 Drawing Sheets

FIG.7A `CODE`

FIG.7B `CODE 1234`

FIG.7C `NO`

FIG.7D `YES`

FIG.7E `SECURITY`

FIG.10D   YES

ELECTRONIC INSTRUMENT HAVING RESETTABLE SECURITY CODE AND METHOD FOR RESETTING SECURITY CODE

BACKGROUND OF THE INVENTION

1. Field of the Invention

The present invention relates to an electronic instrument which provides a resettable security code for preventing burglary and a method for rewriting the security code.

2. Background of the Invention

Of the electronic instruments powered by a battery, such as a car stereo unit, some have conventionally provided a security code set therefor. For example, consider that a thief mounts his stolen instrument in his own car. In this case, the stolen device requires him to input the same security code. Hence, if no match takes place between the security code pre-set in the instrument itself and the inputted security code, the thief cannot use the stolen device.

These kinds of electronic instruments are not operated until the preset security code is entered. This serves to prevent burglary.

The security code is thus required to be strictly protected. Actually, a correspondence table between the serial number of each instrument and the relevant security code is safekept in the manufacturer company or the service center of the company located closer to the user. The security code is distributed to the user as a label.

When the user mounts the electronic instrument to a car, for example, the user is required to enter the distributed security code for starting the instrument.

By the way, the correspondence table on which the security code is described is safekept in the manufacturer company or its branch office or distributed to the user as a lable. This is unfavorable to the security of the code. That is, if the user pastes the distributed label on the electronic instrument, another person can easily get the security code.

Even if another person gets the security code of the user, conventionally, the user cannot change the security code preset when manufacturing the electronic instrument. To avoid this disadvantage, for example, if the electronic instrument is arranged so that the user himself can reset the security code, then the initializing method for resetting the security code has to be made public, which leads to lowering the security level.

Under these circumstances, the present invention is made for overcoming the foregoing shortcomings. It is an object of the present invention to provide an electronic instrument which provides simplified means for managing the security code and a capability of setting the security code and a method for rewriting the security code.

SUMMARY OF THE INVENTION

The foregoing object is achieved by an electronic instrument arranged to enable the operation only if a match takes place between a security code pre-stored in the instrument itself and a security code entered by a user, which includes: a random number generator for generating a random number; an initializing code generator for generating a first initializing code corresponding to the random number generated by the random number generator; a display for displaying the random number generated by the random number generator; initializing code keys used by a user for entering a second initializing code based on the random number displayed on the display; a comparator for comparing the initializing code generated by the initializing code generator with the second initializing code entered through the initializing code keys; and a controller for enabling the reset of the security code pre-stored in the electronic instrument only if a match between the first initializing code and the second initializing code is determined by the comparator.

The foregoing object is achieved by a method for resetting the security code in the electronic instrument for enabling the operation only if a match takes place between the security code pre-stored in the electronic instrument and the security code entered by the user, which includes the steps of: generating a random number; entering a first initializing code corresponding to the generated random number; enabling a user to enter a second initializing code based on the generated random number; comparing the generated first initializing code with the second initializing code; and enabling reset of the security code pre-stored in the electronic instrument only if a match between the first initializing code and the second initializing code is determined by the comparator.

DESCRIPTION OF THE PREFERRED EMBODIMENTS

The description will be oriented to an electronic instrument according to the present invention with reference to the appended drawings.

The embodiment of the electronic instrument concerns with a car stereo unit. For example, the car stereo unit provides a method for rewriting a security code, which includes the steps of generating a random number when a user mounts the instrument to the car, displaying the random number, comparing a first initializing code corresponding to the random number with a second initializing code corresponding to the random number entered by a user, and enabling rewrite of the security code for permitting the operation of the electronic instrument if a match between the first initializing code and the second initializing code is determined as a result of the comparison.

Figure 1:
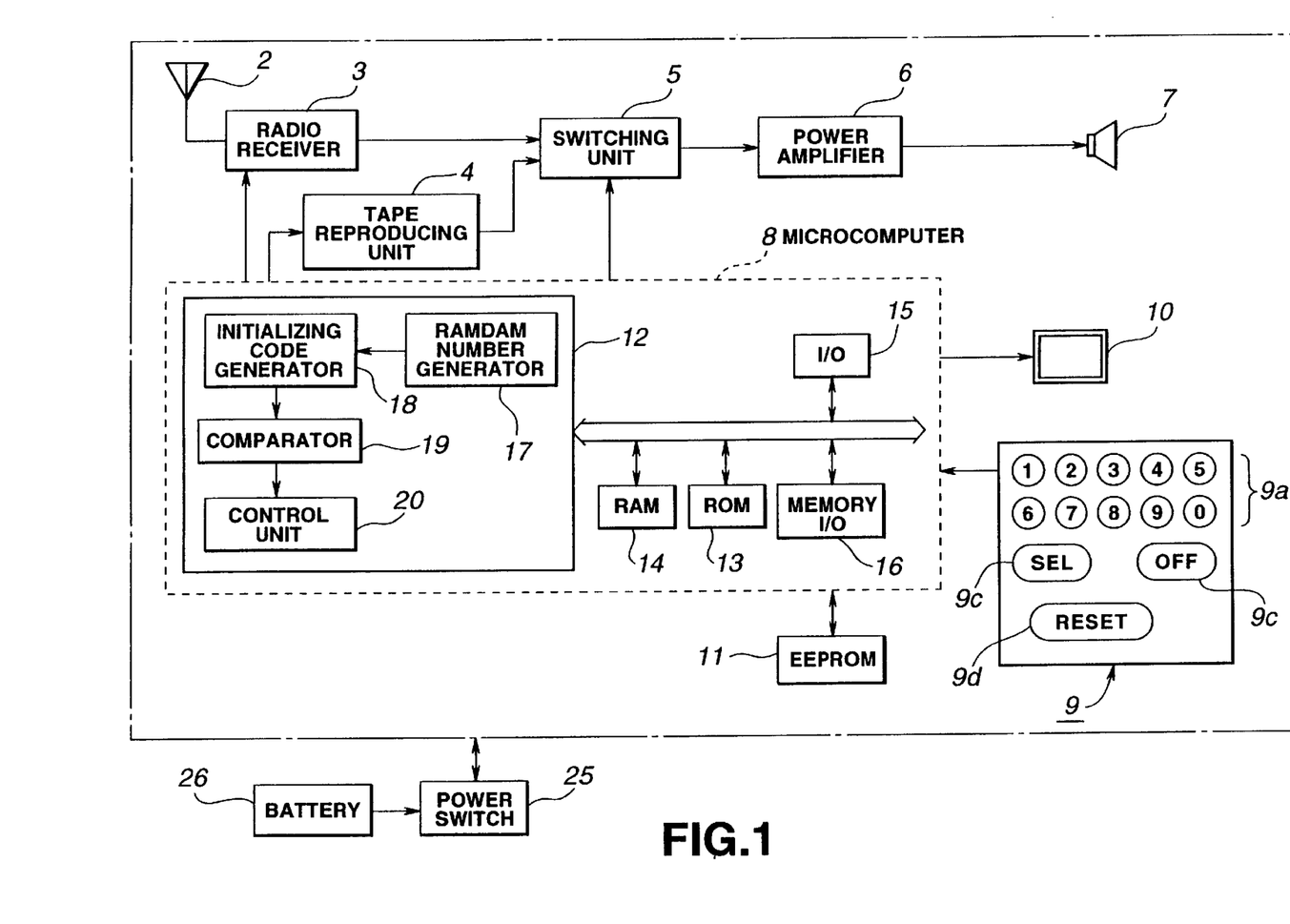
FIG. 1 is a block diagram showing an electronic instrument applied to the present invention.

The car stereo unit, as shown in FIG. 1, includes an antenna 2 for receiving a radio wave, a radio receiver 3 for being inputted with a radio wave received by the antenna 2, a tape reproducing unit 4 for reproducing data from an inserted tape cassette, a switcher 5 for switching the radio receiving unit 3 or the tape reproducing unit 4, a power amplifier 6 for amplifying a signal outputted from the switching unit 5, a speaker 7 for sounding the signal outputted by the power amplifier 6 as an audio signal, a microcomputer 8 for controlling the radio receiver 3, the tape reproducing unit 4 and the switching unit 5, an operation button board 9 having numerical value buttons 9a, a SET button 9b, an OFF button 9c and a RESET button 9d, which are selectively pressed for selecting a radio station, liquid crystal display (LCD) 10 for displaying the selectively pressed result of the operation button board 9, and an EEPROM (Electrically Erasable Programmable Read-only Memory) 11.

The microcomputer 8 is composed of a CPU 12, a ROM 13 for storing a program or data of the CPU 12, a RAM 14 for storing numerical values entered by the numerical value buttons 9a of the operation button board 9, an I/O interface 15 between the radio receiver 3, the tape reproducing unit 4 or the switcher 5 and the CPU 12, and a memory I/O interface 16 between the EEPROM 11 and the CPU 12.

The CPU 12 further provides a random number generator 17 for generating a random number and displaying the generated random number on an LCD 10, an initializing code generator 18 for generating a first initializing code based on the random number, a comparator 19 for comparing the numerical value stored in the RAM 14 and the first initializing code generated by the initializing code generator 18, and a controller 20 for enabling the operation of the instrument if a match of the compared result is determined by the comparator 19.

Figure 2:
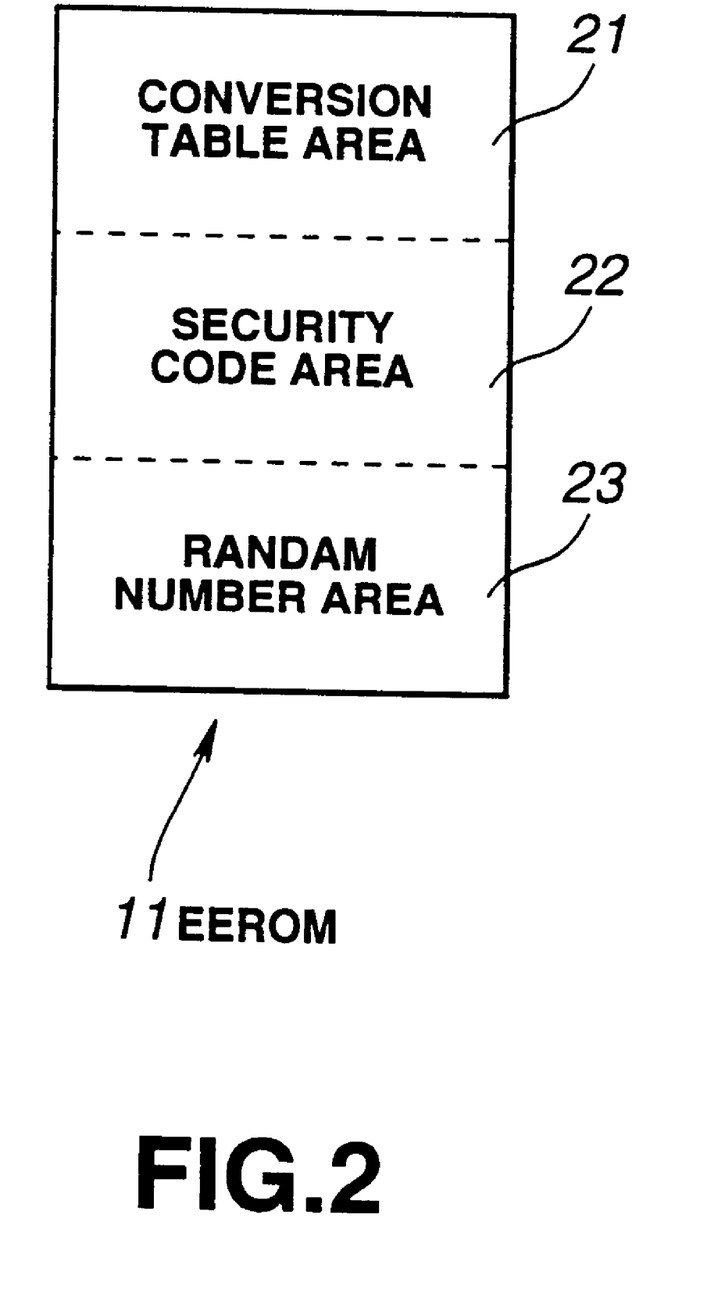
FIG. 2 is a view showing a memory map of a memory EEPROM 11.

As shown in FIG. 2, the EEPROM 11 is composed of a conversion table area 21 composed of the random number and the first initializing code corresponding to the random number, a security code area 22 for saving the security code, and a random number area 23 for saving a random number generated by the random number generator 17.

By referring to the conversion table saved in the conversion table area 21, the initializing code generator 18 operates to generate the first initializing code corresponding to the random number generated by the random number area 23. Further, the comparator 19 enables to compare the security code saved in the security code area 22 with the numerical value stored in the RAM 14 as will be discussed below.

The security code area 22 and the random number area 23 are kept initialized when shipped from the factory.

The car stereo unit 1 arranged as described above is powered by a battery 26 through a battery switch 25.

The car stereo unit 1 powered by the battery 26 can be used by setting the security code. Herein, the description will be oriented to how the car stereo unit 1 may be used only by entering the security code after the car stereo unit 1 is shipped from the factory or when it is transferred to another car. This description is expanded along the flowchart shown in FIG. 3.

Figure 3:
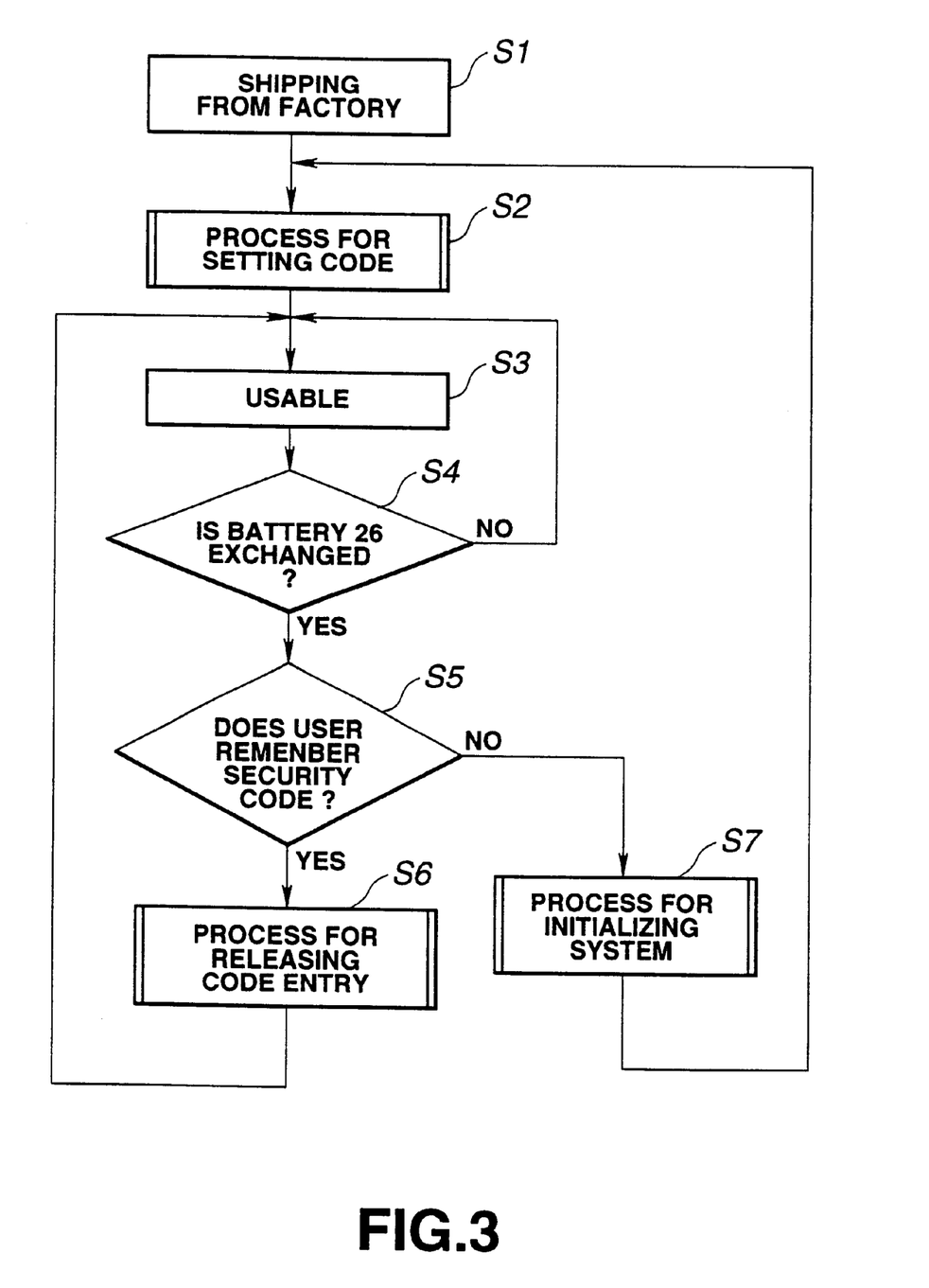
FIG. 3 is a flowchart showing a method for processing a security code when exchanging a battery of a movable device or mounting an electronic instrument to the movable device.

At first, when the car stereo unit 1 is shipped from the factory at a step S1, as mentioned above, the security code area 22 of the EEPROM 11 is kept initialized. Then, at a step S2, the user sets the security code. The entered security code is saved in the security code area 22. By setting the security code, the car stereo unit 1 becomes usable as indicated at a step S3.

Then, at a step S4, the car stereo unit 1 remains usable until the battery 26 is exchanged. However, if the battery 26 is removed for exchange, the car stereo unit 1 cannot be used until the same security code as the previously set code is entered. That is, the car stereo unit 1 cannot be used unless the security code is released. In a case that a non-conducting time of the battery 26 is written in the RAM 14 and the actual non-conducting time reaches the written time, the exchange of the battery 26 or the removal of the car stereo unit 1 from the car is determined. Then, the CPU 12 operates to require the entry of the security code.

In response to the request for the entry of the security code issued from the car stereo unit 1, if the user remembers the security code, the user advances the operation from the step S5 to a step S6 so that the user can enter the same security code as the previously set code for enabling the car stereo unit 1 to execute the process for releasing the code entry. On the other hand, if the user does not remember the security code, the user advances the operation from the step S5 to a step S7 at which the car stereo unit 1 enables to execute the process for initializing the system so that the user can reset the security code.

If the user completes the process for releasing the code entry at the step S6, the user can use the car stereo unit 1. Further, if the user completes the process for initializing the system at the step S7, by setting the new security code again, the car stereo unit 1 is enabled. Further, in the process for releasing the code entry at the step S6, if the user's entry of the security code is failed five times, the car stereo unit 1 is not operated until the process for initializing the system is executed.

The foregoing description was concerned with the case that the car stereo unit 1 can be used after it is shipped from the factory by setting the security code, the case that the car stereo unit 1 can be used by entering the security code again in the process for releasing the code entry after the battery is exchanged, or the case that the system can be used by setting the security code again in the process for initializing the system.

In turn, the description will be oriented to the code setting process, the code entry releasing process or the system initializing process in detail.

Figure 4:
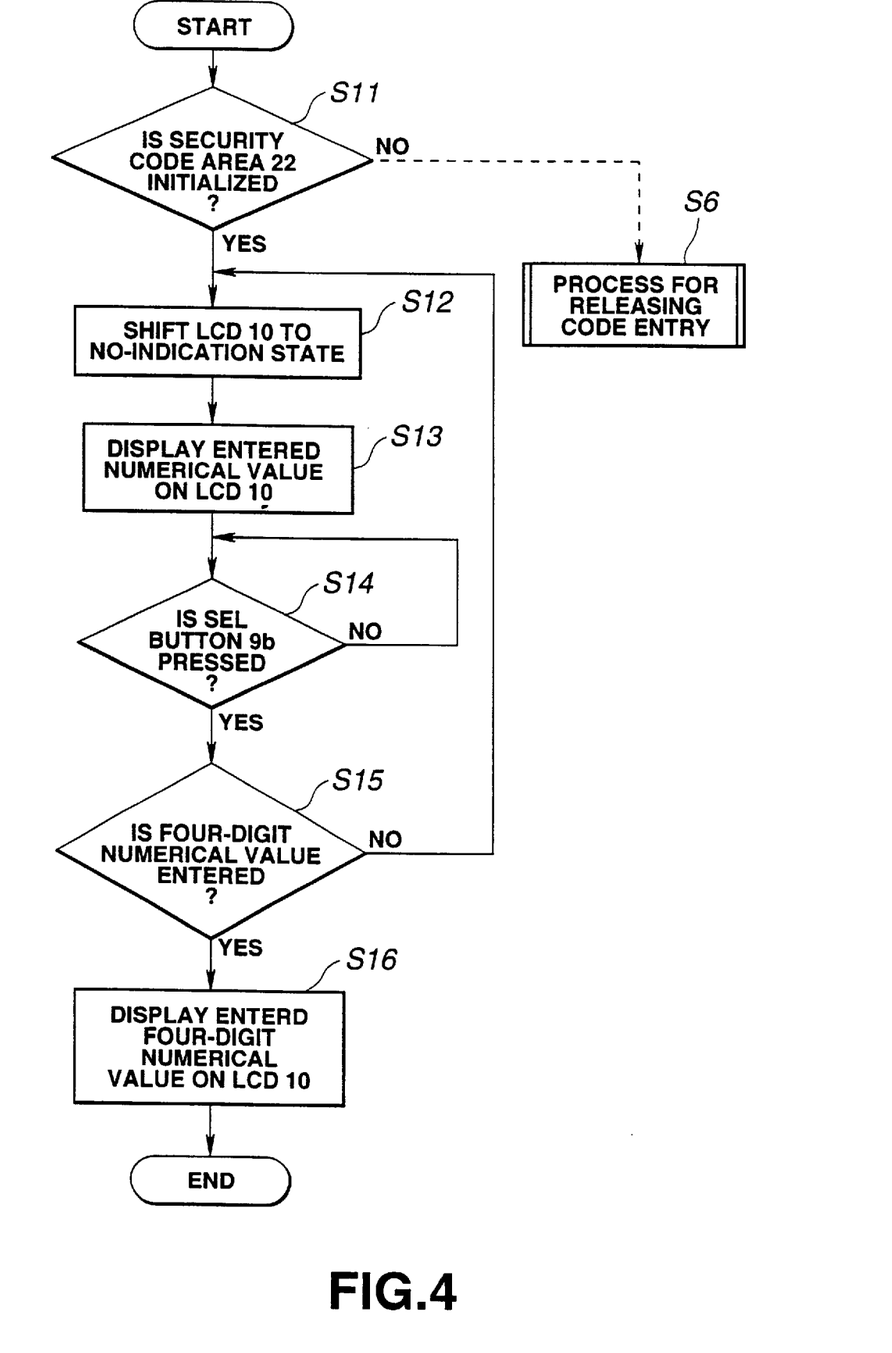
FIG. 4 is a flowchart showing a process for setting a security code.

At first, the code setting process will be described along the flowchart of FIG. 4. The LCD 10 displays the progressing status of the code setting process as shown in Figs. 5A to 5D. The user can set the code as watching the LCD for checking the current setting operation.

The process for setting the code is started by pressing a SEL button 9b located on the operation button board 9. After making sure that the SEL button 9b is pressed, the CPU 12 checks if the security code area 22 of the EEPROM 11 is in the initializing state as shown at S11 in FIG. 4. For example, when the security code has been entered, the CPU determines that the security code area 22 is not in the initializing state. Then, the CPU 12 shifts the operation to the process for releasing the code entry at a step S6 shown in FIG. 3.

On the other hand, after making sure that the security code area 22 is in the initializing state, the CPU 12 operates the LCD 10 to display nothing. At this time, the LCD 10 changes the clock indication shown in FIG. 5A to no indication shown in FIG. 5B.

Figure 5A:
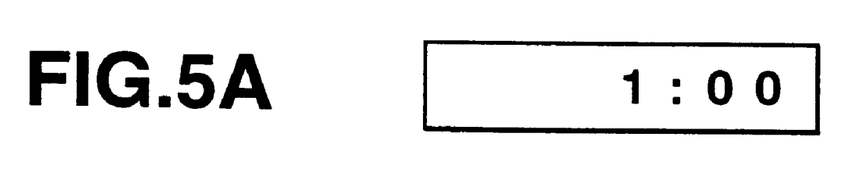
FIG. 5A is a view showing a clock indication appearing on a display in a normal state.
Figure 5B:
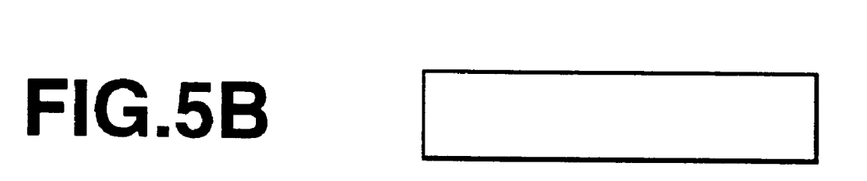
FIG. 5B is a view showing an indication of the display when setting the security code.
Figure 5C:
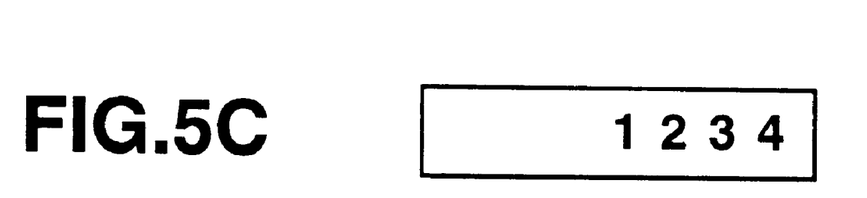
FIG. 5C is a view showing an indication of the display while the security code is being set.
Figure 5D:
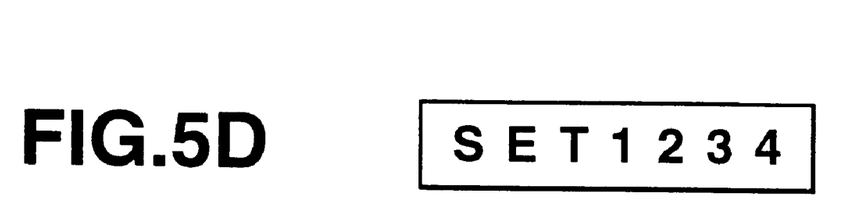
FIG. 5D is a view showing an indication of the display when releasing the enter of the security code.

From the change of the display of the LCD 10, the user can make sure that the security code can be entered. Then, the user selectively presses the numerical value button 9b of the operation button board 9 for entering a four-digit security code, for example, "1", "2", "3" and "4" in sequence. The CPU 12 operates to display the numerical value entered by the operation button board 9 on the LCD 10 as indicated at a step S13. That is, as shown in FIG. 5C, the LCD 10 operates to display the numerical value "1 2 3 4". Then, the CPU 12 enters into the waiting state for the press of the SEL button 9b as indicated at the step S14. If the user determines that the numerical value is erroneously entered on the LCD that is displaying the numerical value, the user presses the OFF button 9c of the operation button board 9 for canceling the entry.

After completion of the entry of the security code, the user presses the SEL button 9b again. When the CPU 12 makes sure of the press of the SEL button 9b, the CPU 12 goes to a step S15. At this step, the CPU 12 checks if the entered numerical value has four digits. If it has four digits, the CPU 12 goes back to a step S12. At this step, the CPU 12 operates the LCD 10 to cancel the display and requests the user to enter the security code again.

When the CPU 12 makes sure of the entry of the four-digit numerical value at the step S15, at a step S16, the CPU 12 operates the LCD 10 to display the indication "SET 1234" for five seconds and save the numerical value as the security code in the security code area 22 of the EEPROM 11. Then, the user can make sure that the security code is entered on the indication "SET 1234" displayed on the LCD 10.

The foregoing code setting process is executed to set the security code. Then, as mentioned above, the set security code is made to be a code for releasing the code entry when exchanging the battery 26, for example.

Figure 6:
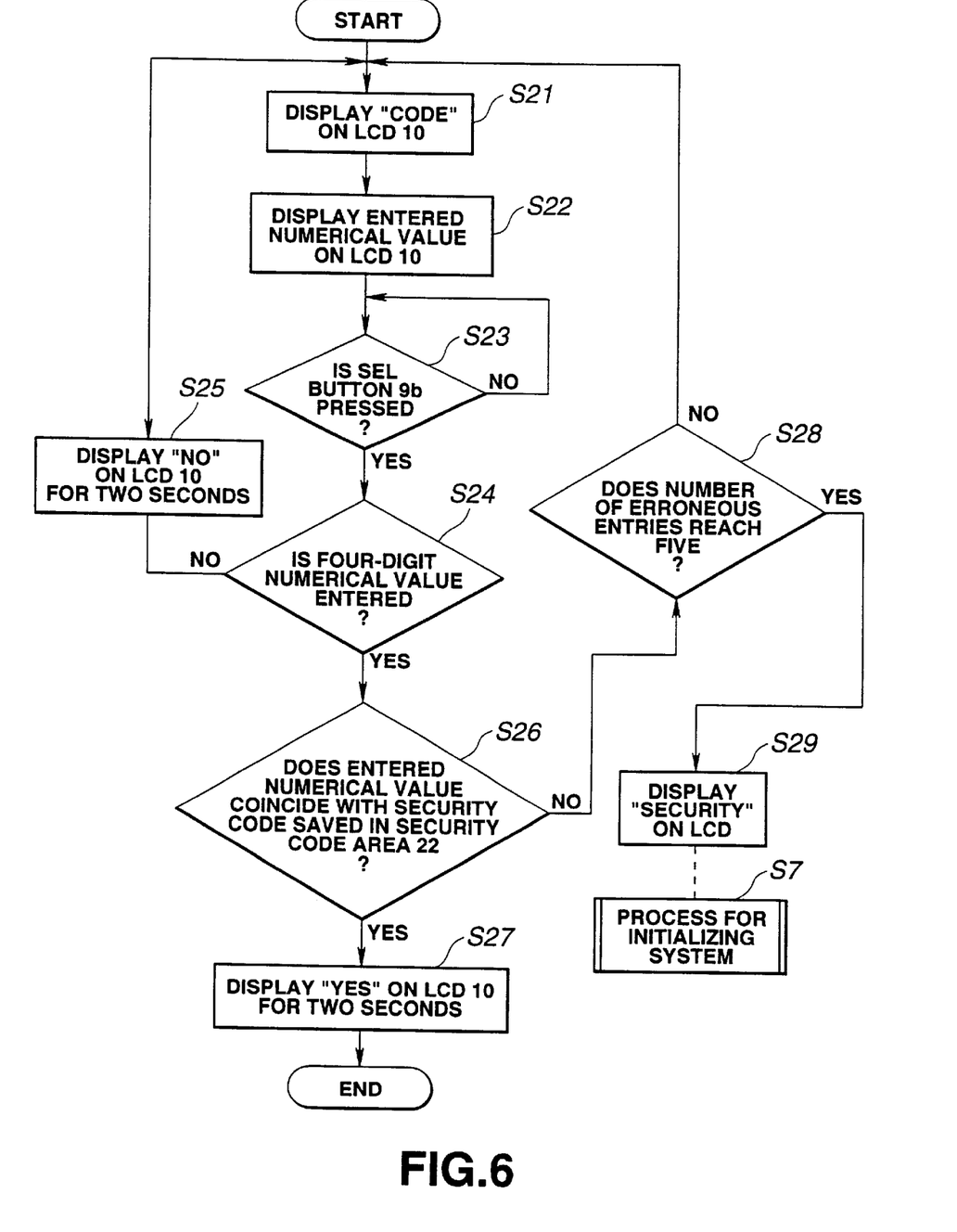
FIG. 6 is a flowchart showing a process for entering and releasing the security code.

In turn, the description will be oriented to the process for releasing the code entry along the flowchart of FIG. 6. As shown in FIGS. 7A to 7E, the LCD 10 displays the progressing status of the process for releasing the code entry. Hence, the user can release the code entry while watching the indication of the LCD 10.

Figure 7A:
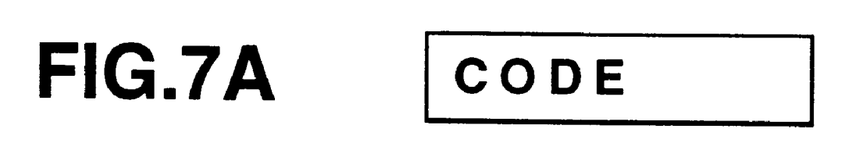
FIG. 7A is a view showing an indication of the display appearing when entering and releasing the security code.
Figure 7B:
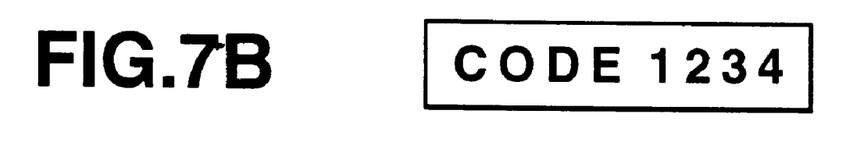
FIG. 7B is a view showing an indication of the display appearing when entering the security code.

At first, when the current is supplied from the battery 26 to the car stereo unit 1, the CPU 12 operates the LCD 10 to display an indication "CODE" as shown in FIG. 7A. On the indication, the user makes sure that the security code is allowed to be entered and then presses the numerical value buttons 9a corresponding to a four-digit numerical value of "1", "2", "3" and "4" for entering the numerical value. The CPU 12 operates the LCD 10 to display the entered numerical value and stores it in the RAM 14 at a step S22. Then, at a step S23, the CPU 12 enters into the state for waiting for the press of the SEL button 9b. At this time, as shown in FIG. 7B, the LCD 10 is operated to display the "CODE 1234". If the user determines that the numerical value is erroneously entered on the LCD that is displaying the numerical value, the user presses the OFF button 9c for canceling the erroneous numerical value.

Figure 7C:
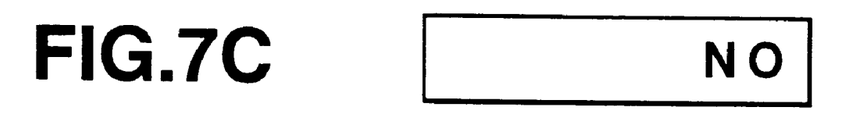
FIG. 7C is a view showing an indication of the display appearing if a mismatch takes place between the entered security code and the pre-stored security code.

After terminating the entry of the numerical value, the user presses the SEL button 9b. The CPU 12 confirms this press and then checks if the numerical value stored in the RAM 14 has four digits as indicated at the step S24. If the numerical value stored in the RAM 14 does not have four digits, at a step S25, the CPU 12 operates to display an indication of "NO" on the LCD 10 for two seconds as shown in FIG. 7C. Then, the CPU 12 returns to the step S21 at which the CPU 12 operates to display "CODE" on the LCD 10 and requires the user to enter the security code.

Figure 7D:
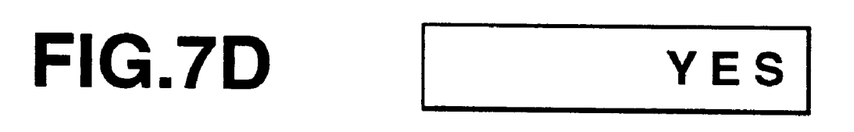
FIG. 7D is a view showing an indication of the display appearing if a match takes place between the entered security code and the pre-stored security code.

On the other hand, at the step S24, if the CPU determines that the numerical value stored in the RAM 14 has four digits, the comparator 19 of the CPU 12 operates to compare the numerical value stored in the RAM 14 with the security code saved in the security code area 22 as indicated at the step S26. If the numerical value stored in the RAM 14 is determined to be identical with the security code saved in the security code area 22, at a step S27, the CPU 12 operates to display "YES" on the LCD 10 for two seconds as shown in FIG. 7D and then terminates the process for releasing the code entry. On the termination of the process for releasing the code, the control unit 20 enables the operation of the system.

For example, if the different numerical value from the security code set by the user at the previous time is inputted through the use of the operation button board 9, the CPU 12 determines that the numerical value stored in the RAM 14 is not identical with the security code saved in the security code area 22. Then, the CPU 12 advances the operation from the step S26 to the step S28.

At the step S28, the CPU 12 checks the number of times the erroneous security code is inputted. If the number of times does not reach five, the CPU 12 returns to the step S21 at which it requires the user to re-enter a new numerical value.

Figure 7E:
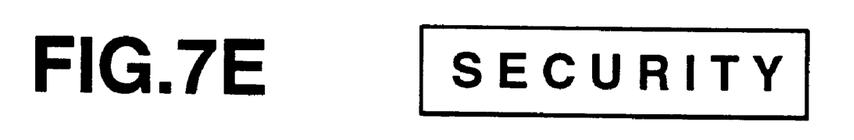
FIG. 7E is a view showing an indication of the display appearing if a predetermined number of mismatches or more take place between the entered security code and the pre-stored security code.

On the other hand, if the number of times reaches five, at the step S29, the CPU 12 operates to display the "SECURITY" on the LCD 10 as shown in FIG. 7E. Then, the CPU 12 shifts the operation to the process for initializing the system indicated at the step S7 of FIG. 3.

The aforementioned process makes it possible for the user to shift the system to the process for initializing the security code stored in the memory of the electronic instrument if the user does not remember the previously set security code.

Therefore, the user can set the security code to the car stereo unit 1 by himself. This eliminates the necessity of safekeeping the security code in the manufacturer or its branch office. As a result, the management of the security code is simplified and the leakage of the security code to another person is prevented. Further, the car stereo unit 1 removed from the battery 26 provides a capability of preventing another person's release of the security code. This leads to inhibiting the burglary.

On the other hand, it is considered that even an owner may forget the previously inputted security code and cannot release the security code. In this case, to operate the car stereo unit 1, it is necessary to execute the process for initializing the system and set the security code again. With the foregoing technology, the car stereo unit 1 enables to initialize the system without having to make the process for initializing the system public.

Figure 8:
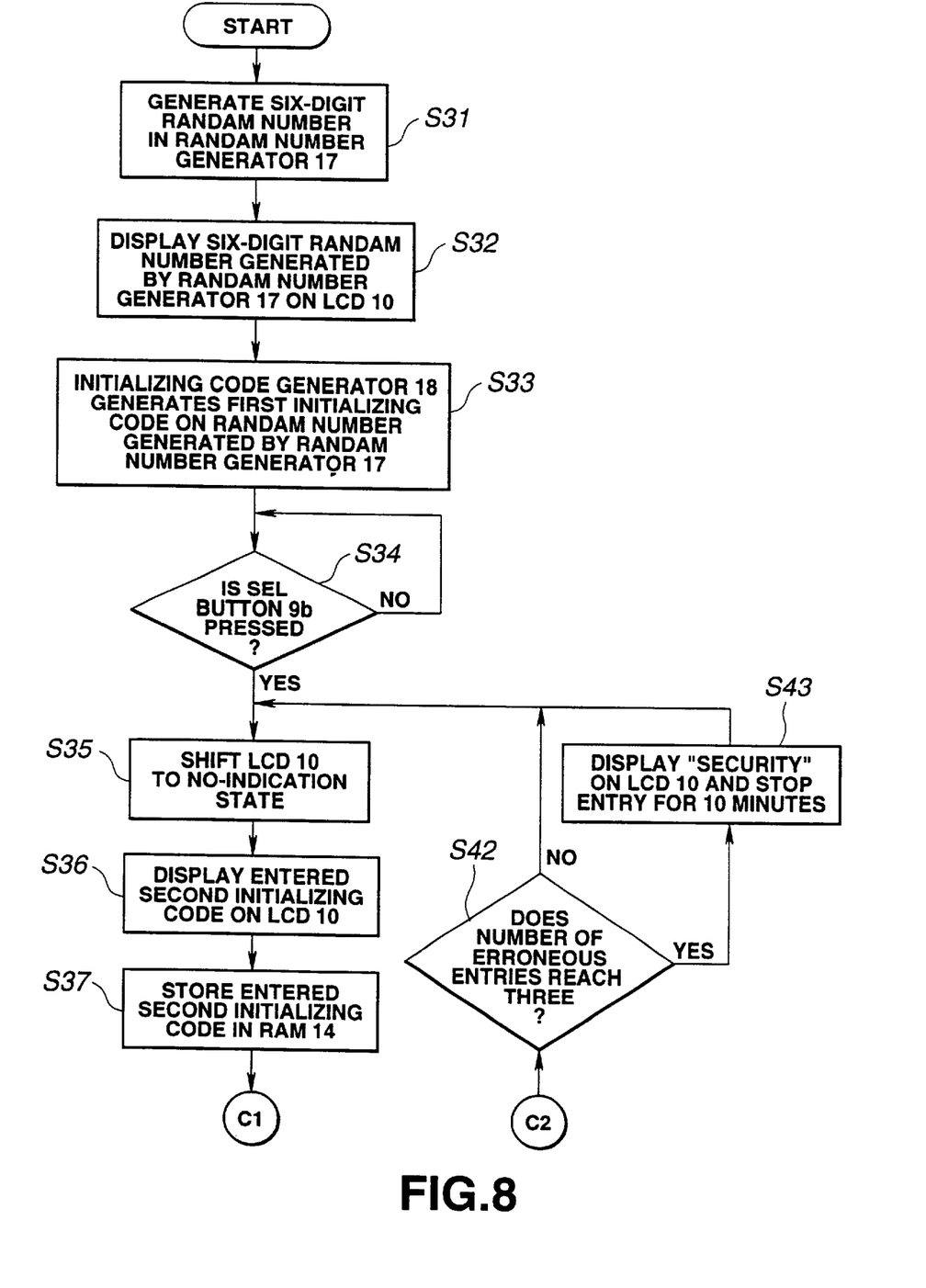
FIG. 8 is a flowchart showing a first half of the process for initializing the security code.
Figure 9:
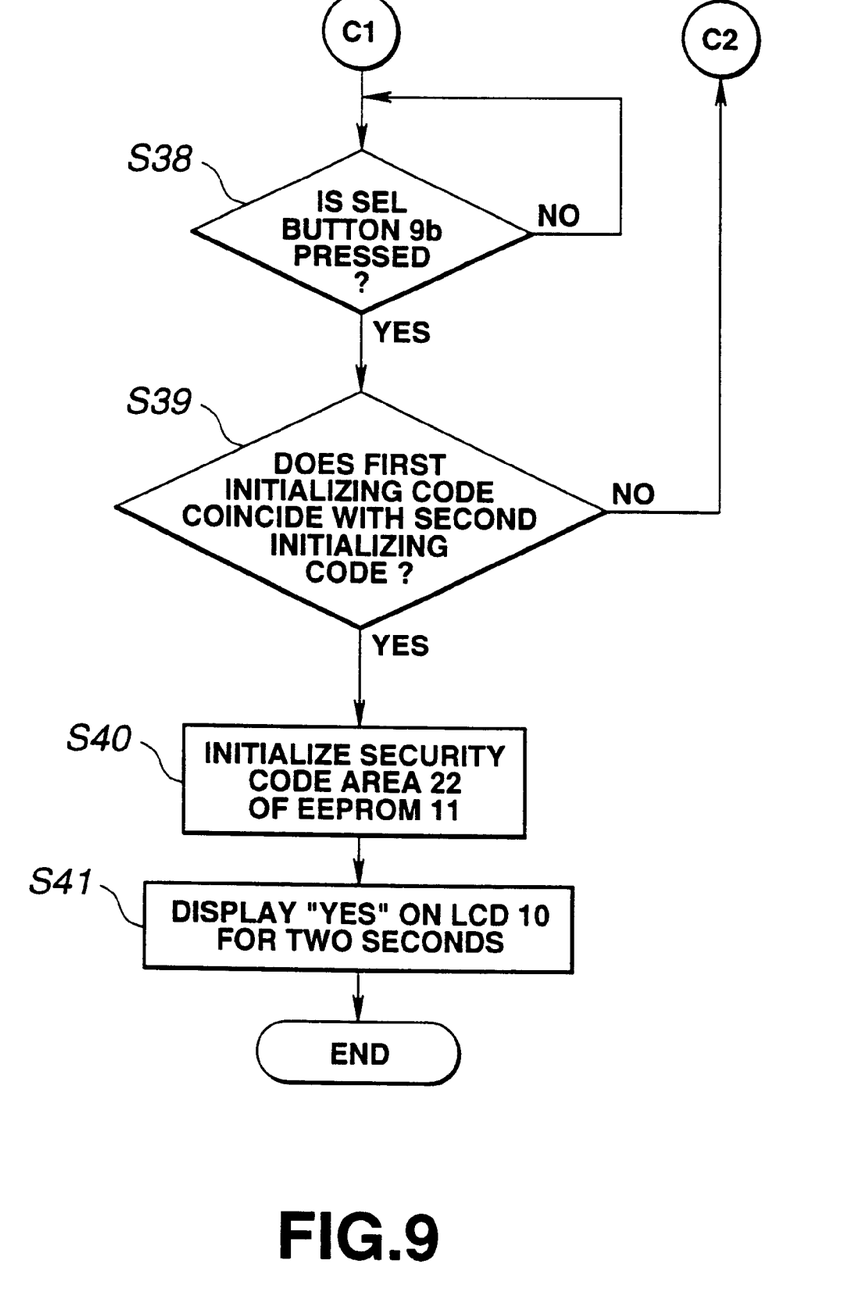
FIG. 9 is a flowchart showing a second half of the process for initializing the security code.

The process for initializing the system will be described in relation to the flowchart shown in FIGS. 8 to 9. The progressing status of the system initializing process is displayed on the LCD 10 as shown in FIGS. 10A to 10D. On the LCD 10, the user can initialize the system as watching the indication of the LCD 10.

The system initializing process is started by pressing the RESET button 9d of the operation button board 9 for two seconds. The CPU 12 makes sure of the press of the RESET button 9d and then generates a six-digit random number through the effect of the random number generator 17 and saves the random number in the random number area 23 of the EEPROM 11 as indicated at the step S31.

Figure 10A:
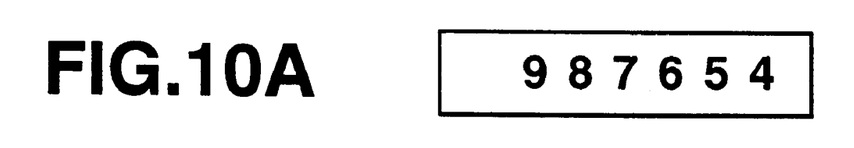
FIG. 10A is a view showing a random number generated by a random number generator appearing on a display.
Figure 10B:
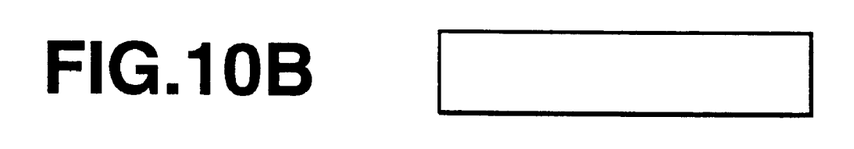
FIG. 10B is a view showing an indication of the display appearing when entering the second initializing code.

Then, as indicated at the step S32, the CPU 12 operates to display on the LCD 10 the random number generated by the random number generator 17. As shown in FIG. 10A, on the LCD 10, the random number generated by the random number generator 17, for example, "987654" is displayed. The user makes sure of the random number by watching an indication of the LCD 10.

On the other hand, as indicated at the step S33, the initializing code generator 18 operates to refer to the conversion table saved in the conversion table area 21 of the EEPROM 11 and generate a first initializing code corresponding to the random number generated by the random number generator 17.

After the aforementioned process, as indicated at the step S34, the CPU 12 enters into the state of waiting for an entry of the second initializing code until the SEL button 9b is pressed.

The user inquires at the service station of the manufacturer of the car stereo unit 1 of the second initializing code corresponding to the random number "987654" displayed on the LCD 10. The service station asks information such as an address and a name of the inquirer for checking if the inquirer is a registered user. After making sure that the inquirer is registered, the second initializing code, for example, "024689" is reported from the service station to the inquirer. This second initializing code is obtained by using the same conversion table as the table stored in the conversion table area 21 of the car stereo unit 1, which is recorded in a computer installed in the service station, for example.

Figure 10C:
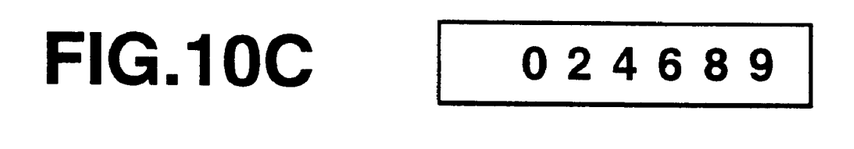
FIG. 10C is a view showing an indication of the display appearing when the second initializing code is being entered.

The user obtains the second initializing code from the service station and presses the SEL button 9b of the car stereo unit 1. The CPU 12 makes sure of this press and changes the display of the LCD 10 into the no-indication state as indicated at the step S35 of FIG. 10B. Then, the user makes sure that the second initializing code entry is allowed by checking the display state of the LCD 10 and selectively presses the numerical value button board 9a for entering the second initializing code "024689". The CPU 12 operates to display the entered second initializing code on the LCD 10 at the step S36 and stores it in the RAM 14 at the step S37. As shown in FIG. 10C, the LCD 10 displays the entered numerical value "024689" as shown in FIG. 10C.

Then, as indicated at the step S38, the CPU 12 enters into the waiting state for the press of the SEL button 9b, makes sure of the press of the SEL button 9b, and advances the operation to a step S39.

At the step S39, the CPU 12 compares the first initializing code generated by the generator 18 with the second initializing code stored in the RAM 14 through the effect of the comparator 19.

If a match takes place between the first initializing code and the second initializing code, the CPU 12 operates to initialize the security code area 22 as indicated at the step S40. By initializing the security code area 22, the car stereo unit 1 enters into the initialized state, which is the same as the shipping state.

Figure 10D:
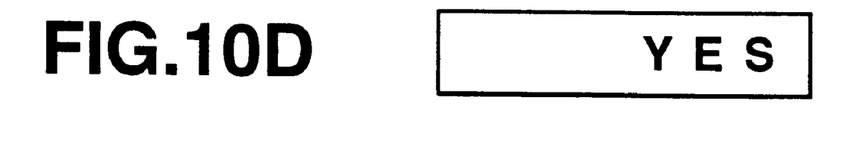
FIG. 10D is a view showing an indication of the display appearing only if a match takes place between the entered second initializing code and the first initializing code prestored in the electronic instrument.

Then, at a step S41, as shown in FIG. 10D, the CPU 12 operates to display "YES" on the LCD 10 and then terminates the process for initializing the system. The user makes sure of the completion of the initialization of the system on the indication "YES" of the LCD 10 and then sets the security code again.

On the other hand, if a mismatch takes place between the first initializing code and the second initializing code at a step S39 as a result of erroneous entry of the second initializing code, for example, the CPU 12 advances the operation to a step S42. At this step, the CPU 12 checks if the number of times of the erroneous entry reaches three. If the number does not reach three times, the CPU 12 returns to the step S35 and then changes the display of the LCD 10 into the no-indication state, on which the CPU requires the user to enter the second initializing code.

If the number of times reaches three, the CPU 12 advances the operation from the step 42 to a step S43. At this step, the CPU 12 operates to display the indication "SECURITY" on the LCD 10 as shown in FIG. 7E and nullifies the entry from the operation button board 9 for ten minutes. After ten minutes, the CPU 12 returns to the step S35 at which the LCD 10 is changed into the no-indication state again. On this display, the CPU 12 requires the user to enter the second initializing code.

Unless the process for initializing the system is terminated, the random number saved in the random number area 23 is not changed. Hence, the same random number is always displayed on the LCD 10 from the start of the system initialization to the end thereof.

The process for initializing the system is executed to initialize the security code area 22 by entering the same second initializing code as the first initializing code corresponding to the random number generated by the random number generator 17. At a time, the system initialization is executed by entering the second initializing code managed by the manufacturer. Hence, the process for initializing the system is not required to be made public. Since the car stereo unit 1 is entered into the shipping state by initializing the security code area 22, the security code can be set by doing the process for setting the code. That is, if the user does not remember the security code set by the user, the user can initialize the system and set the security code of the car stereo unit 1 by himself without having to making the initializing process public.

Since the security code is allowed to be always set by the user, the management of the security code of the car stereo unit 1 is made simpler. Hence, another person cannot make access to the security code. It means that the car stereo unit 1 cannot be used by any person except the user. This serves to protect the stereo car unit 1 from burglary.

Further, the service station safekeeps the second initializing code. Hence, another person cannot initialize the system. This serves to protect the car stereo unit 1 removed from the battery 26 from burglary.

Moreover, the conversion table or the second initializing code safekept in the service station are more simply managed.

The car stereo unit 1 enables to generate the first initializing code derived from the random number through the operation. The service station provides a computer for generating the second initializing code from the random number through the same operation as that of the car stereo unit 1.

In addition, the random number and the first and the second initializing codes of the car stereo unit 1 are not limited to six digits. The digits of those codes may be increased. The increase makes it more difficult for another person to know the second initializing code.

The electronic instrument according to the present invention provides comparing means for comparing the first initializing code generated from the random number by the initializing code generating means with the second initializing code entered from the outside. Only if the first initializing code is made equal to the second initializing code, the initialization of the security code is enabled.

As mentioned above, since the security code can be initialized by the user, even if the user does not remember the security code set, the user can set the security code again by himself.

It is apparent that the thief does not know the set security code. Hence, the thief may enter his presumed security codes for solving the security. To cope with this, the present invention has a limitation of the number of times of security code entry. If the number of times of the erroneous security code entry reaches a predetermined number, the system of the invention is automatically shifted to the process for initializing the security code.

Since the system is automatically shifted to the initializing process, the thief is required by the electronic instrument to enter the second initializing code. Hence, the thief has to inquire with the service center or the manufacturer of the second initializing code.

If the thief inquires with the manufacturer or the service center of the second initializing code, the manufacturer or the service center can check if the inquirer is a registered user.

If the inquiry is given through a phone, the manufacturer or the service center hangs it up and then calls back the inquirer for certifying the inquiry.

In addition, if the registered user gives the manufacturer or the service center the report about the burglary of the electronic instrument, the manufacturer or the service center can report it to the police when someone inquires about the second initializing code.

What is claimed is:

1. An electronic instrument providing a capability of enabling its own operation only when a security code pre-stored in said electronic instrument is matched to a security code entered by a user, comprising:

entering means for enabling the user to enter a security code;

comparing means for comparing the security code entered by the user with the security code pre-stored in said electronic instrument to find a match;

means for automatically entering a reset mode when the match is not found by said comparing means following a predetermined number of entries of the security code by the user using the entering means, wherein following entry into the reset mode a new security code is required from a manufacturer of said electronic instruments;

random number generating means for generating a random number;

storage means formed of an electrically erasable programmable read-only memory having a first area for storing the generated random number, a second area for storing a conversion table, and a third area for storing a security code;

generating means for generating a first initializing code by addressing said conversion table stored in said second area of said storage means using said random number generated by said random number generating means and storing the first initializing code in said third area of said storage means as said security code;

display means for displaying said random number generated by said random number generating means, wherein when the user reports said random number displayed on said display means and certifying information about the user to the manufacturer of said electronic instrument, the manufacturer addresses an identical conversion table using said random number to generate and report a second initializing code to the user for entry using said entering means as the new security code;

wherein said comparing means compares said first initializing code generated by said generating means and read out from said third area of said storage means with said second initializing code entered by said entering means; and control means for enabling the security code pre-stored in an electronic instrument to be reset when a match between said first and second initializing codes is determined by said comparing means.

2. A method for resetting a security code pre-stored in an electronic instrument for enabling the operation of said instrument when a match takes between said security code pre-stored in said electronic instrument and a security code by a user, comprising the steps of:

enabling the user to enter a security code;

comparing the security code entered by the user with the security code pre-stored in said electronic instrument to find a match;

automatically entering a reset mode when the match is not found in said step of comparing following a predetermined number of entries of the security code by the user in said step of enabling, wherein following entry into the reset mode a new security code is required from a manufacturer of said electronic instrument;

generating a random number;

storing the generated random number in a first storage area of an electrically erasable programmable read-only memory, wherein the electrically erasable programmable read-only memory also has a conversion table stored in a second area and a security code stored in a third area;

generating a first initializing code by addressing the conversion table stored in said second area of said electrically erasable programmable read-only memory using the generated random number;

storing the first initializing code in the third area of the electrically erasable programmable read-only memory as said security code;

displaying said random number;

reporting said random number displayed in said step of displaying and certifying information about the user to the manufacturer of said electronic instrument and receiving a second initializing code generated by the manufacturer by addressing the same a conversion table having the same contents as the conversion table stored in the second area of the electrically erasable programmable read-only memory using said random number reported by the user for entry by the user as the new security code;

reading out the first initializing code stored in the third area of the electrically erasable programmable read-only memory;

comparing the first initializing code read out from the electrically erasable programmable read-only memory with said entered second initializing code; and enabling the reset of said security code pre-stored in said electronic instrument when a match takes place between said first initializing code and said second initializing code.

* * * * *